INVENTOR.
TSUNEO HARIKAE

INVENTOR.
TSUNEO HARIKAE

United States Patent Office 3,282,307
Patented Nov. 1, 1966

3,282,307
VALVE FOR A LIQUEFIED GAS FUEL LIGHTER
Tsuneo Harikae, 12/21 2-chome, Asakusa-Kotobuki-cho, Taito-ku, Tokyo, Japan
Filed Feb. 7, 1964, Ser. No. 343,348
Claims priority, application Great Britain, Jan. 27, 1964, 3,473/64
10 Claims. (Cl. 141—295)

The present invention relates to a filling valve for a lighter using liquefied gas fuel, for example butane gas. Such a lighter has a fuel reservoir which is charged with liquefied gas, by means of a filling vessel.

Filling valves for gas lighters have been proposed, in which the reservoir of the lighter is connected to a filling vessel of liquefied gas, through a hollow needle which penetrates a plug in the vessel, or in which the reservoir of the lighter is connected to a filling cartridge of liquefied gas by piercing a fuel-containing cartridge whereby the fuel will flow into the reservoir. Prior lighter valves have been provided with springs such as metal coil or leaf springs or springs of elastomeric materials for controlling the fuel inlet passage to the reservoir and the outlet passage for exhaust gas from the reservoir. Furthermore, in these prior constructions a movable part is actuated by such springs to connect with the filling vessel or cartridge by means of inserting or piercing. In genneral, these lighter valves incorporate a fuel inlet passage and a gas exhaust passage.

In addition, the prior valves may require several washers or seals to ensure satisfactory closing of the inlet and outlet passages and these closure elements are controlled by the springs above mentioned.

In the prior art, the closure elements are secured to the movable element and the fixed part to prevent the filled liquefied gas from escaping. Thus, for completely satisfactory operation, the construction of the valve must be complicated by providing several supplemental parts to the main elements. As such prior valves are of somewhat complicated construction they are expensive to produce.

It is one object of the present invention to provide a filling valve for a liquefied gas fuel lighter which is of simple construction, smooth in operation, and inexpensive to produce.

It is another object of the present invention to provide a valve for a liquefied gas fuel lighter having a fuel reservoir which is refilled from a filling vessel having a spout, whereby the valve comprises a tubular member for receiving the spout of said filling vessel, an inlet passage in said tubular member for inflow of liquefied gas fuel under pressure, a first internal annular projection in said tubular member, a second internal annular projection in said tubular member spaced from said first projection, an exhaust passage in said tubular member for connecting said reservoir with atmosphere and having an outlet opening between said projections, a resiliently deformable annular closure member in said tubular member sandwiched between said projections, an outer face on said closure member which engages said first projection to close said exhaust passage and which is disengageable from said first projection by said spout to open said exhaust passage, and a movable member in said tubular member movable inwardly under the action of pressure of inflowing fuel to open said inlet passage and movable outwardly under the action of fuel pressure in said reservoir after completion of a filling operation to engage said annular member and close said inlet passage against escape of fuel from the fuel reservoir.

Further according to the present invention there is provided a valve for a liquefied gas fuel lighter having a fuel reservoir which is refilled from a filling vessel having a spout, said valve comprising a tubular member for receiving the spout of said filling vessel, an inlet passage in said tubular member for inflow of liquefied gas fuel under pressure, a first internal annular projection in said tubular member, a second internal annular projection in said tubular member spaced from said first projection, an exhaust passage in said tubular member for connecting said reservoir with atmosphere and having an outlet opening between said projections, an annular closure member in said tubular member, said annular closure member being movable into engagement with said first projection for closure of said exhaust passage and movable out of engagement with said first projection by said spout for opening of said exhaust passage, and a movable member in said tubular member movable inwardly under the action of pressure of inflowing fuel to open said inlet passage and movable outwardly under the action of fuel pressure in said reservoir after completion of a filling operation to engage said annular member and effect closure of said inlet and exhaust passages against escape of fuel from the fuel reservoir.

The valve according to the invention thus opens and closes the filling and exhaust passages by utilizing the pressure of the liquefied gas discharging from the filling container and effects communication with the filling vessel simply by pressing the tip portion of the filling vessel spout onto the closure member, without piercing as previously indicated.

With these and other objects in view which will become apparent in the following detailed description, the present invention will be clearly understood in connection with the accompanying drawings, in which.

Figure 1:
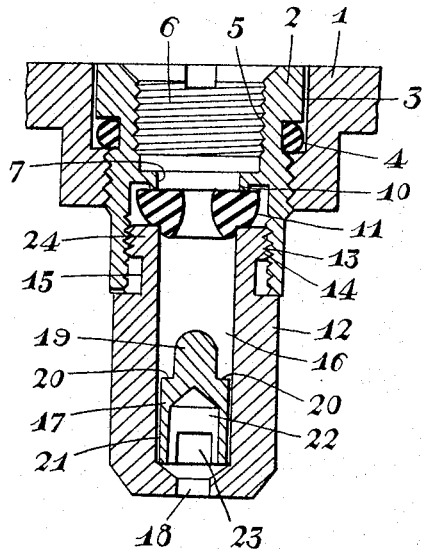
FIGURE 1 is a sectional view of a valve embodying the present invention, the valve being shown in inverted position prior to a filling operation.

With reference to FIG. 1, a lighter is provided at the bottom of its reservoir 1 with a filling opening, in which is screwed a stationary part 2 of a valve, said valve being of tubular form and screwed into a part 3 of the wall of the reservoir. A liquid-tight sealing ring or washer 4 is provided between parts 2 and 3. The part 3 has a screw-threaded interior 5 for a removable closure plug 6, and has an internal annular projection 7 which is adapted to receive a spout or neck portion 9 of the filling vessel 8. The projection 7 is formed with an under jaw or face 10 to engage an annular closure member 11. To provide a passage for escape of the gas from the reservoir 1, the diameter of the annular projection 7 is somewhat larger than that of the spout 8 of the filling vessel 8. The stationary part 2 is connected to a second stationary part 12 by interengaging screw threads 13 and 14. Said second part 12 is provided near its outer end with an annular groove 15. The interior 16 of the part 12 has an opening in connection with the hollow of the stationary part 2 and a movable member 17 is freely slidable along the interior face of part 12, not by spring action but by utilising the pressure from the filling vessel and the back pressure from the reservoir on completion of a filling operation. At the base of part 12 a passage 18 opening to the reservoir is provided.

The movable member 17 comprises a head portion 19, shoulder portion 20, and a side wall or skirt 21 which provides a hollow 22. The hollow 22 receives the back pressure after filling and an opening 23 for inflowing fuel is formed in the wall 21.

Figure 2:
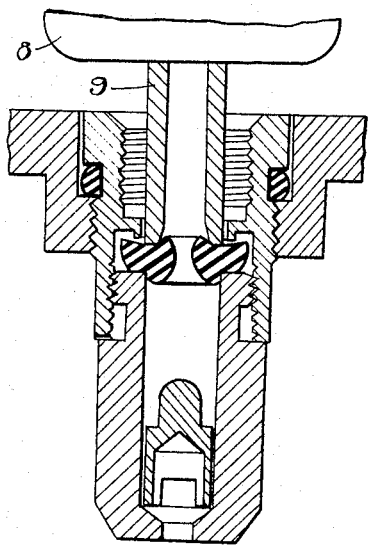
FIG. 2 is a view corresponding to FIG. 1, but showing the filling position of the valve with the spout of the filling vessel in engagement with the valve.
Figure 3:
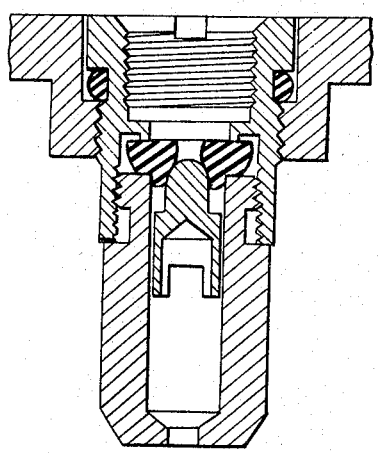
FIG. 3 is a view corresponding to FIG. 1, but showing the closed position of the valve.

The closure member 11 is elastically seated between the projection 7 and the inwardly-projecting shoulder 24 of the second stationary part 12. As shown in FIGS. 1, 2 and 3, the member 11 is in the form of a ring of generally semi-circular elevation having a central opening 25 for inflow of liquefied gas. After filling of the reservoir, the movable member 17 is forced against the member 11 by means of the back pressure of the fuel in the reservoir, through the passage 18, so that the head portion 19 closes the opening 25.

In operation, as the spout 8 of the filling vessel 9 is inserted through the annular projection 7 and its nozzle end is pressed against the outer face of the closure member 11, the latter is deformed and as a result the connection between the under face 10 of the projection 7 and the closure member will be broken. Thus, the liquefied gas discharge under pressure from the spout 9 of the filling vessel 8 will exert pressure on the head portion 19 of the movable member 17, and by this action the member 17 is moved inwardly towards the base of the part 12. The liquefied gas discharged from the filling vessel 8 passes through the opening 25 which is in the closure member 11, then through the interior 16 of the part 12 and firstly the head portion 19 and secondly the side wall 21. The liquefied gas then passes through the opening 23 and the guide passage 18 into the reservoir 1. Simultaneously, gas in the reservoir will escape to atmosphere through the groove 15, then between the threads of the parts 2 and 12, and then through the space between the projection 7 and the spout 8 of the filling vessel. On completing a filling operation, the movable member 17 is pushed outwardly towards the closure member 11 by the pressure of the fluid enclosed in the reservoir 1. The member 17 will then seal the central opening in member 11 and the closure member 11 will be simultaneously pressed outwardly, whereby its outer face will engage part 10 of the annular projection 7.

Figure 4:
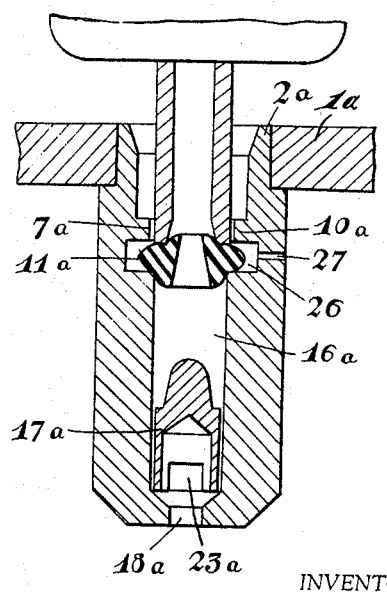
FIG. 4 is a sectional view showing an alternative construction of the valve, in the filling position.
Figure 5:
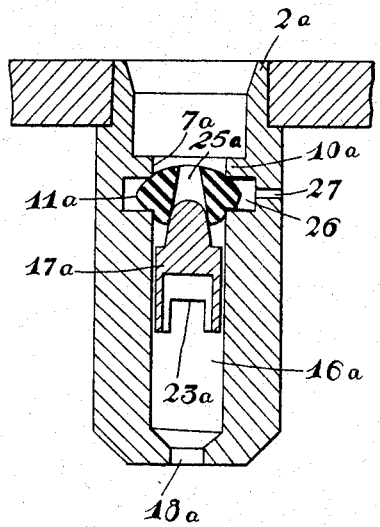
FIG. 5 is a view corresponding to FIG. 4, but showing the closed position of the valve.

FIGS. 4 and 5 show a construction somewhat simpler than that of FIGS. 1 to 3. In this embodiment, however, the tubular member comprises a single stationary part 2a, which has a neck portion of reduced external diameter. The neck portion of the part 2a is secured in an opening in the reservoir in a fluid-tight manner.

Towards its outer end the part 2a is formed with an internal projection 7a which has a jaw portion 10a. Inwardly of the portion 10a is an annular channel 26 and an annular closure member 11a is located in the channel 26. The member 11a, which is approximately elliptical in side elevation, is formed of resiliently deformable material and is engaged by the inwardly projecting faces which define the channel 26. A radial bore 27 opens into a channel 26, to provide an exhaust passage to atmosphere from the interior of the reservoir 1a.

The operation of the valve shown in FIGS. 4 and 5 is similar to that shown in FIGS. 1 to 3. When the spout of the filling vessel is inserted into the tubular member 2a and pressed against the closure member 11a, the outer face of the member 11a, is moved inwardly to open the gas exhaust passage from the reservoir 1a; exhausting gas discharges from bore 27 into annular channel 26 to pass outwardly through the annular space between the spout and the projection 7a. Thus, liquefied gas can flow from the filling vessel, which has a suitable outlet control valve, and enter the reservoir 1a. The pressure of the liquefied gas moves member 17a inwardly against the now reduced back pressure from the reservoir 1a and the liquefied gas flows through the opening in the member 11a to the interior 16a of member 2a. The liquefied gas then flows past the member 17a and through opening 23a to enter the reservoir through passage 18a.

On completion of a filling operation, the member 17a is moved outwardly to close the inlet opening in the closure member 11a by the back pressure in the reservoir, and contact is restored between the member 11a and the jaw projection 10a to close the exhaust passage. As in the embodiment of FIGS. 1 to 3 the bore 27 is spaced a short distance from the base of the reservoir to permit the reservoir to be filled satisfactorily but not completely; it will be understood that complete filling with liquefied gas could result in undesirably high pressure in the reservoir 1a, for example, due to increase in ambient temperature.

Figure 6:
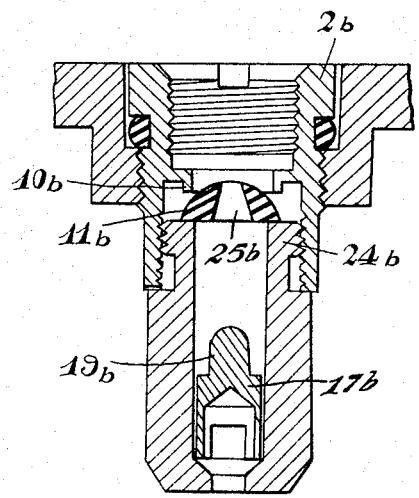
FIG. 6 shows a further embodiment of construction of the valve, in the position prior to filling.
Figure 7:
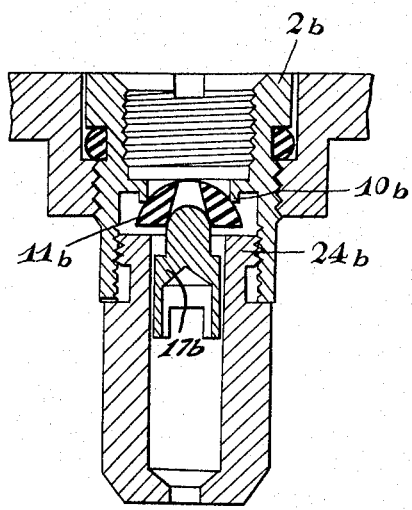
FIG. 7 is a view corresponding to FIG. 6, but showing the closed position of the valve.

FIGS. 6 and 7 show another embodiment of the present invention, in which closure member 11b is similar to the member 11 shown in FIGS. 1 to 3. However, member 11b is freely movable between shoulder 24b of stationary part 2b, and after a filling operation the member 11b may move into contact with jaw portion 10b for closure of the exhaust passage.

Thus, when the spout of the vessel 9 is inserted into the tubular member and is pressed on the outer face of the closure member 11b, liquid fuel (under pressure) flows from the vessel and moves the closure member 11b bodily inwardly to disengage from jaw portion 10b. Filling then proceeds as described above. After filling, the movable member 17b and the closure member 11b are pushed outwardly whereby the head 19b of the member 17b is inserted into opening 25b of the closure member 11b, which re-engages jaw portion 10b to close the inlet and exhaust passages.

Figure 8:
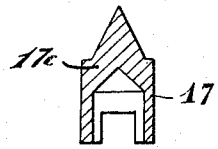
FIG. 8 is a sectional view of an alternative form of the movable valve member.

Modifications may be made without departing from the scope of the invention. For instance, the closure member shown in FIGS. 1 to 3 may be inverted and also the movable member 17 shown in FIGS. 1 to 7 may be formed as a member 17c with a conical head portion as shown in FIG. 8.

It will be appreciated therefore that the valves of the present invention are of simple construction and prove very satisfactory in operation in comparison with known valves, and are considerably cheaper, than that of many other valves for use in cigarette and like lighters.

While I have disclosed several embodiments of the present invention, it is to be understood that these embodiments are given by example only and not in a limiting sense, the scope of the present invention being determined by the objects and the claims.

I claim:
1. A valve for a liquefied gas fuel lighter having a fuel reservoir to be refilled from a filling vessel having a spout, said valve comprising a tubular member for receiving the spout of said filling vessel, said tubular member having an inlet passage for inflow of liquefied gas fuel under pressure, a first internal annular radially inwardly extending projection in said tubular member, a second internal annular projection in said tubular member axially spaced from said first projection said tubular member having an exhaust passage for connecting said reservoir with atmosphere and having an outlet opening between said projections, a resiliently deformable annular closure member in said tubular member sandwiched between said projections, said closure member having an outer face and the latter engaging said first projection to close said exhaust passage and disengageable from said first projection by said spout to open said exhaust passage, and a movable member disposed in said tubular member and freely movable inwardly under the action of pressure of inflowing fuel to open said inlet passage and freely movable outwardly under the action of fuel pressure in said reservoir after completion of a filling operation, to engage said annular closure member and close said inlet passage against escape of fuel from the fuel reservoir.

2. The valve, as set forth in claim 1, wherein said tubular member comprises an outer part an an inner part in screw threaded engagement with said outer part.

3. The valve, as set forth in claim 1, wherein said tubular member comprises an integral.

4. The valve, as set forth in claim 1, wherein said annular closure member is flat topped and generally semi-circular in side elevation.

5. The valve, as set forth in claim 1, wherein said annular closure member is flat bottomed and is generally semi-circular in side elevation.

6. The valve, as set forth in claim 1, wherein said annular closure member is generally elliptical in side elevation.

7. The valve, as set forth in claim 1, wherein said movable member comprises an outer end of conical form for engagement with said closure member.

8. The valve, as set forth in claim 1, wherein said movable member comprises an outer end of hemispherical form for engagement with said annular closure member.

9. The valve, as set forth in claim 1, wherein said movable member comprises an inner and formed as a skirt providing a hollow to receive back pressure from said reservoir for compressing the head portion of said movable member against said closure member.

10. A valve for a liquefied gas fuel lighter having a fuel reservoir which is refilled from a filling vessel having a spout, said valve comprising a tubular member for receiving the spout of said filling vessel, said tubular member having an inlet passage for inflow of liquefied gas fuel under pressure, a first internal annular radially inwardly extending projection in said tubular member, a second internal annular projection in said tubular member axially spaced from said first projection, said tubular member having an exhaust passage for connecting said reservoir with atmosphere and having an outlet opening between said projections, an annular closure member disposed in said tubular member, said annular closure member being movable into engagement with said first projection for closure of said exhaust passage and movable out of engagement with said first projection by said spout for opening of said exhaust passage, and a movable member disposed in said tubular member freely movable inwardly under the action of pressure of inflowing fuel to open said inlet passage and freely movable outwardly under the action of fuel pressure in said reservoir after completion of a filling operation to engage said annular member and effect closure of said inlet and exhaust passage against escape of fuel from said fuel reservoir.

References Cited by the Examiner

UNITED STATES PATENTS

| 2,769,325 | 11/1956 | Storch | 141—349 X |
| 2,989,091 | 6/1961 | Lowenthal | 141—292 X |
| 3,039,499 | 6/1962 | Peterson | 141—302 X |
| 3,044,503 | 7/1962 | Iketani | 141—293 |
| 3,148,712 | 9/1964 | Zellweger | 141—293 |
| 3,174,519 | 3/1965 | Pizzurro et al. | 141—295 |

FOREIGN PATENTS 1,329,993   5/1963   France.

LAVERNE D. GEIGER, *Primary Examiner.*

H. BELL, *Examiner.*